United States Patent [19]

Babbitt

[11] 3,907,098
[45] Sept. 23, 1975

[54] BEAM TRANSFER MECHANISM
[75] Inventor: Albert B. Babbitt, Pontiac, Mich.
[73] Assignee: Premier Engineering Company, Inc., Madison Heights, Mich.
[22] Filed: July 13, 1973
[21] Appl. No.: 378,830

[52] U.S. Cl. .............................. 198/218; 214/1 BB
[51] Int. Cl. .......................................... B65g 25/04
[58] Field of Search .................. 198/218; 214/1 BB

[56] References Cited
UNITED STATES PATENTS

| | | | |
|---|---|---|---|
| 3,456,814 | 7/1969 | Bautz ................... | 198/218 |
| 3,590,986 | 7/1971 | Andrews et al. ..... | 198/218 |
| 3,655,070 | 4/1972 | Haydu .................. | 198/218 |
| 3,661,247 | 5/1972 | Wallis .................. | 198/218 |
| 3,782,561 | 1/1974 | Orii ..................... | 198/218 |

*Primary Examiner*—Evon C. Blunk
*Assistant Examiner*—Jeffrey V. Nase
*Attorney, Agent, or Firm*—Whittemore, Hulbert & Belknap

[57] ABSTRACT

A beam-type transfer mechanism for moving workpieces step by step along a row of stations. A pair of laterally spaced beams extend parallel to the row of stations, having opposed work holding fixtures cooperable to grip the workpieces. The beams are movable laterally toward and away from each other, vertically up and down and longitudinally in forward and rearward directions to simultaneously advance the workpieces one step at a time from station to station.

10 Claims, 20 Drawing Figures

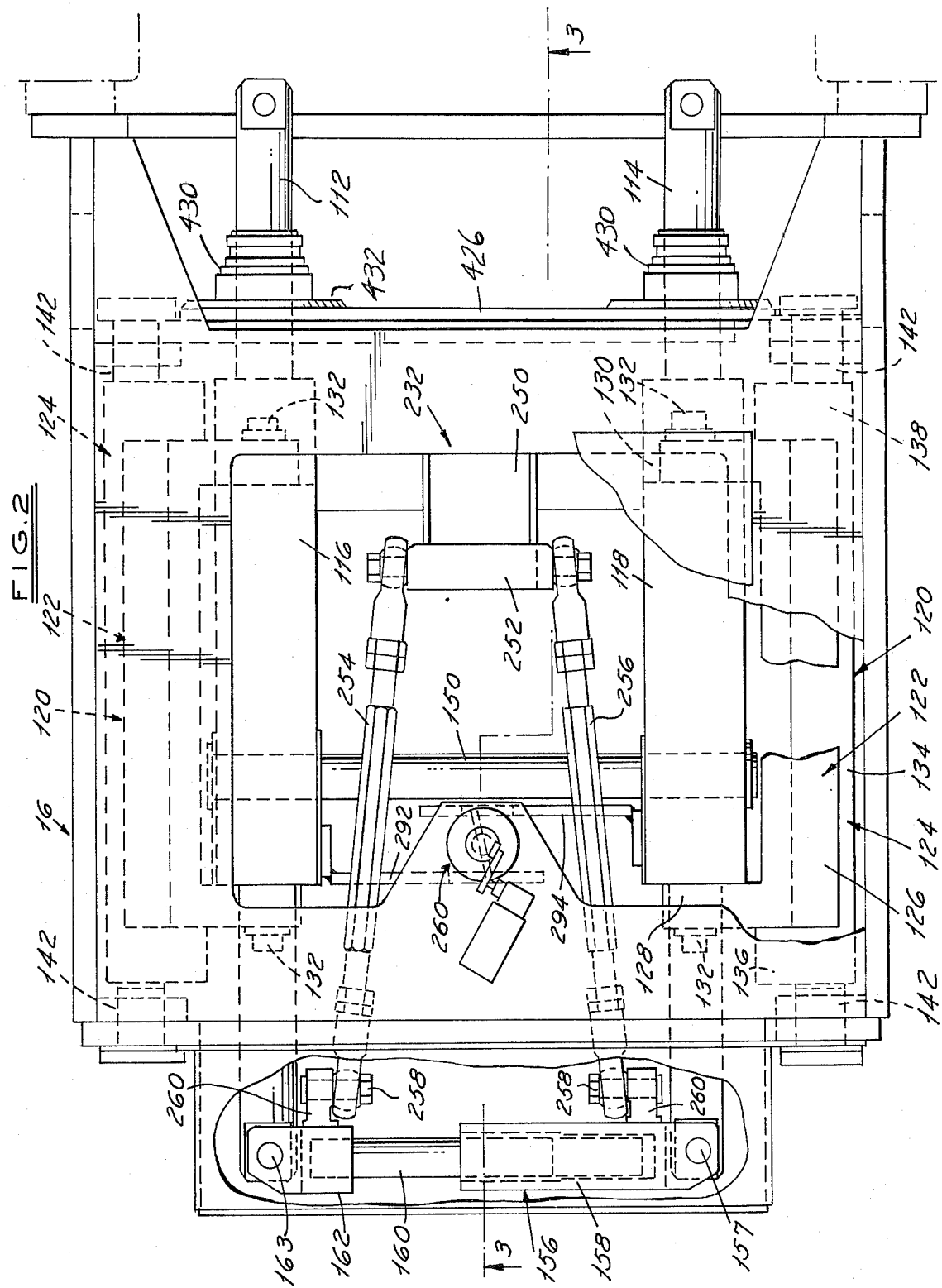

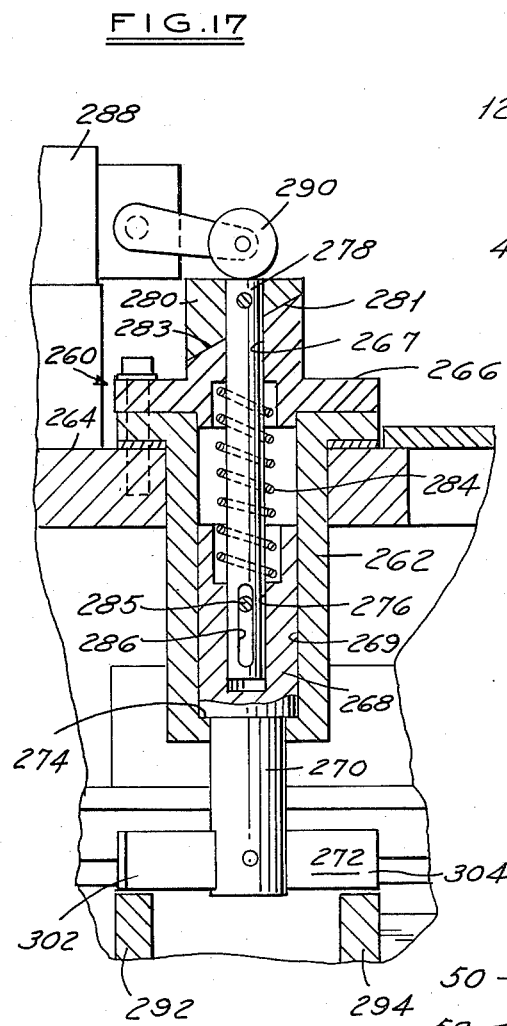
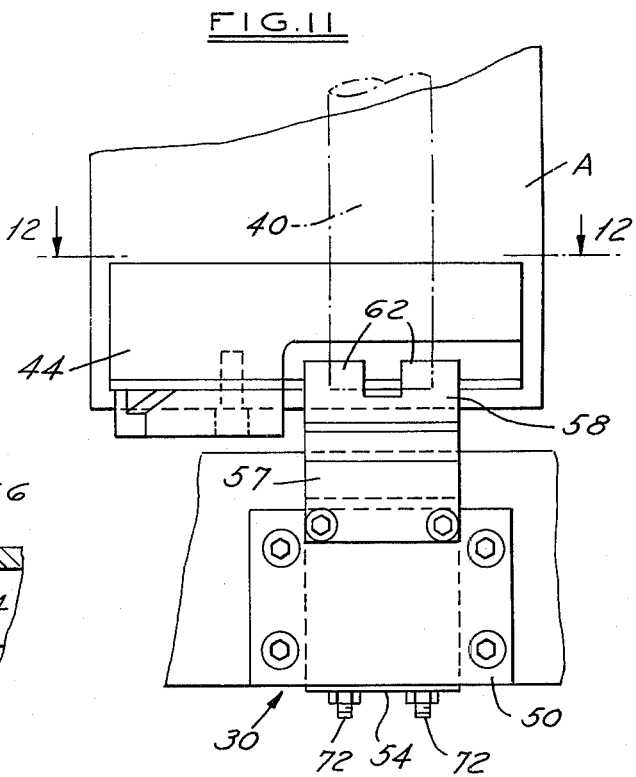
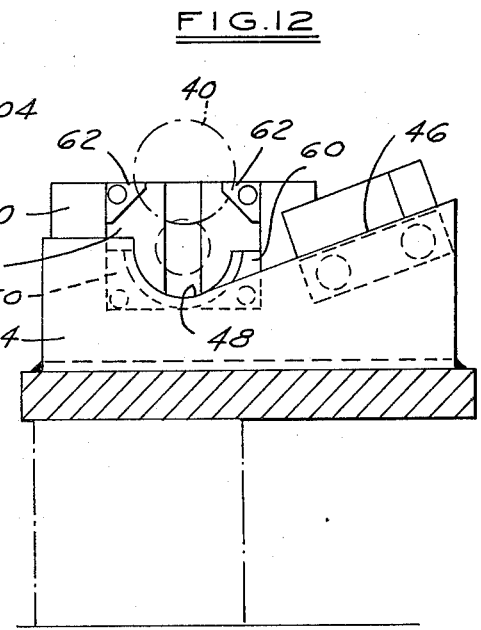

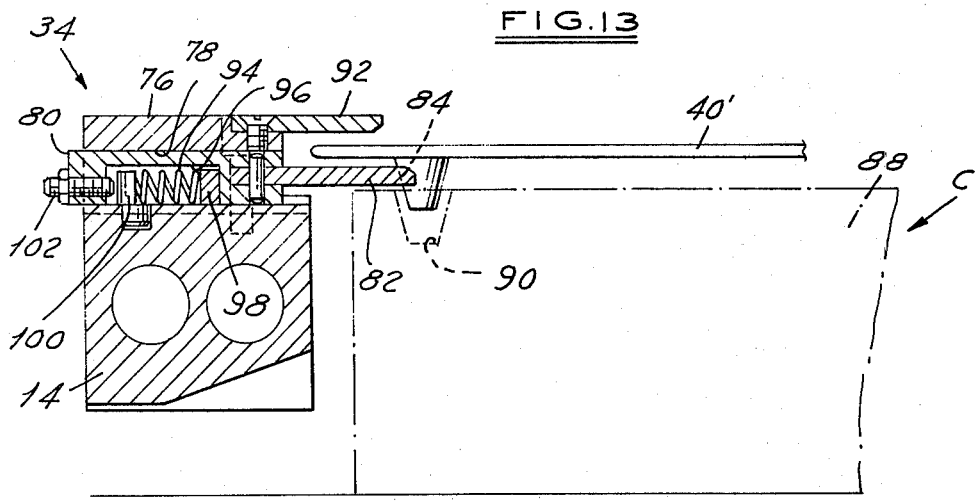
FIG.13
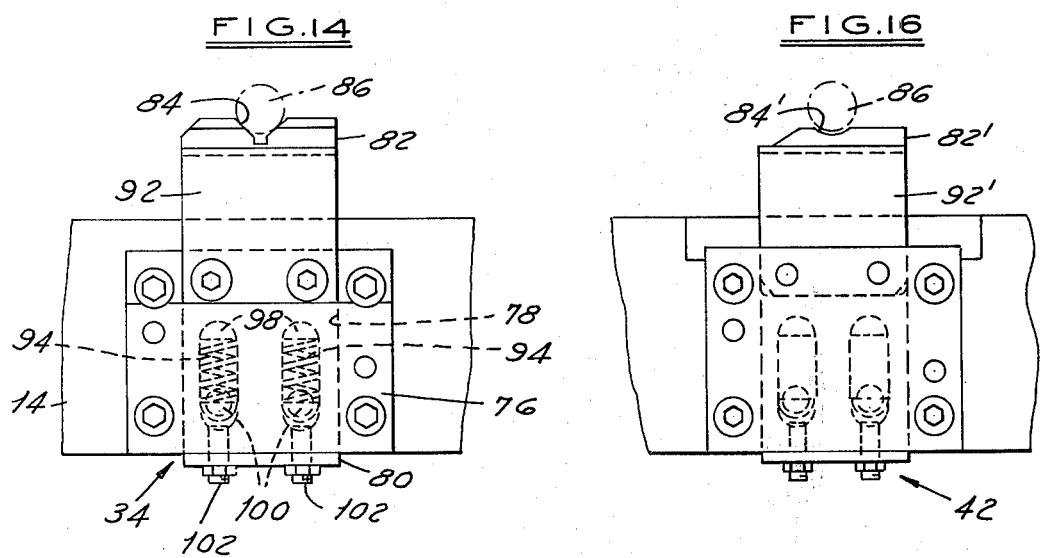
FIG.14
FIG.16
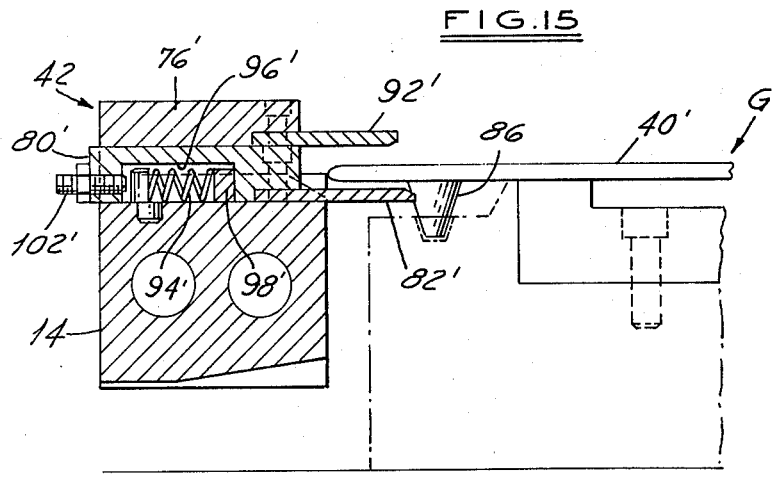
FIG.15

BEAM TRANSFER MECHANISM

SUMMARY OF THE INVENTION

The parallel beams of this transfer mechanism have their ends respectively slidably supported in carriers. These carriers are simultaneously moved in and out, that is toward and away from each other to cause the opposing fixtures thereon to grip and release the workpieces. The carriers are likewise simultaneously moved up and down to raise the gripped workpieces away from the stations and to lower them back to the stations. The carriers support the beams for longitudinal sliding movement so that they may be simultaneously moved longitudinally in a forward direction to advance the workpieces one station and rearwardly to return the empty work holding fixtures to their starting positions.

In the specific embodiment about to be disclosed, control units are provided at both ends of the beam transfer mechanism which are synchronized to effect a simultaneous movement of the carriers so as to maintain the parallel relationship of the beams throughout their vertical and horizontal movements. Each control unit includes cams which engage followers on the carriers to carry out the vertical and horizontal movements of the carriers in a timed sequence. Such cams of the two units are driven from a common source to coordinate their movements.

One of the control units has a cam drive for affecting the longitudinal movement of the beams in timed sequence with the vertical and horizontal movements thereof.

The preferred apparatus embodying the invention includes a safety shutoff for shutting down the transfer mechanism in the event of a malfunction such as might occur for example if a workpiece becomes jammed at one of the stations or becomes hung up in a die. Also provided in the preferred apparatus about to be described are means for retaining a substantially true or parallel relationship of the carriers during their various movements.

In the Drawings:

FIG. 2 is a top plan view with parts broken away of one of the control units provided at one end of the transfer mechanism.

FIG. 11 is a top plan view of the structure shown in FIG. 10.

FIG. 12 is an elevational view taken on the line 12—12 in FIG. 11.

FIG. 13 is a fragmentary sectional view taken on the line 13—13 in FIG. 1.

FIG. 14 is a plan view of the structure shown in FIG. 13.

FIG. 15 is a fragmentary sectional view taken on the line 15—15 in FIG. 1A.

FIG. 16 is a top plan view of the structure shown in FIG. 15.

FIG. 17 is an enlarged view of a portion of FIG. 3.

Figure 1:
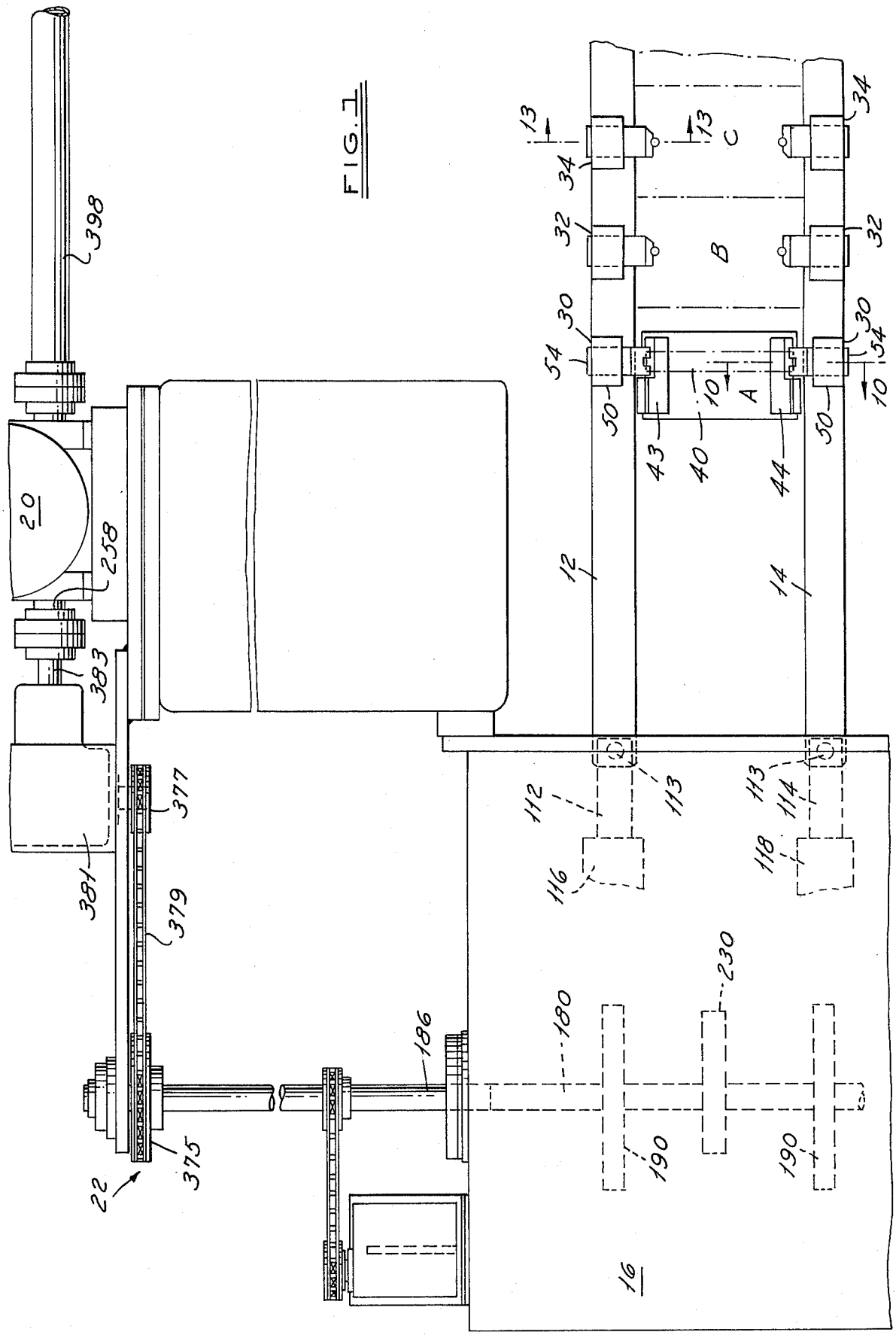
FIG. 1 is a top plan view of a portion of a beam transfer mechanism constructed in accordance with my invention.
Figure 1A:
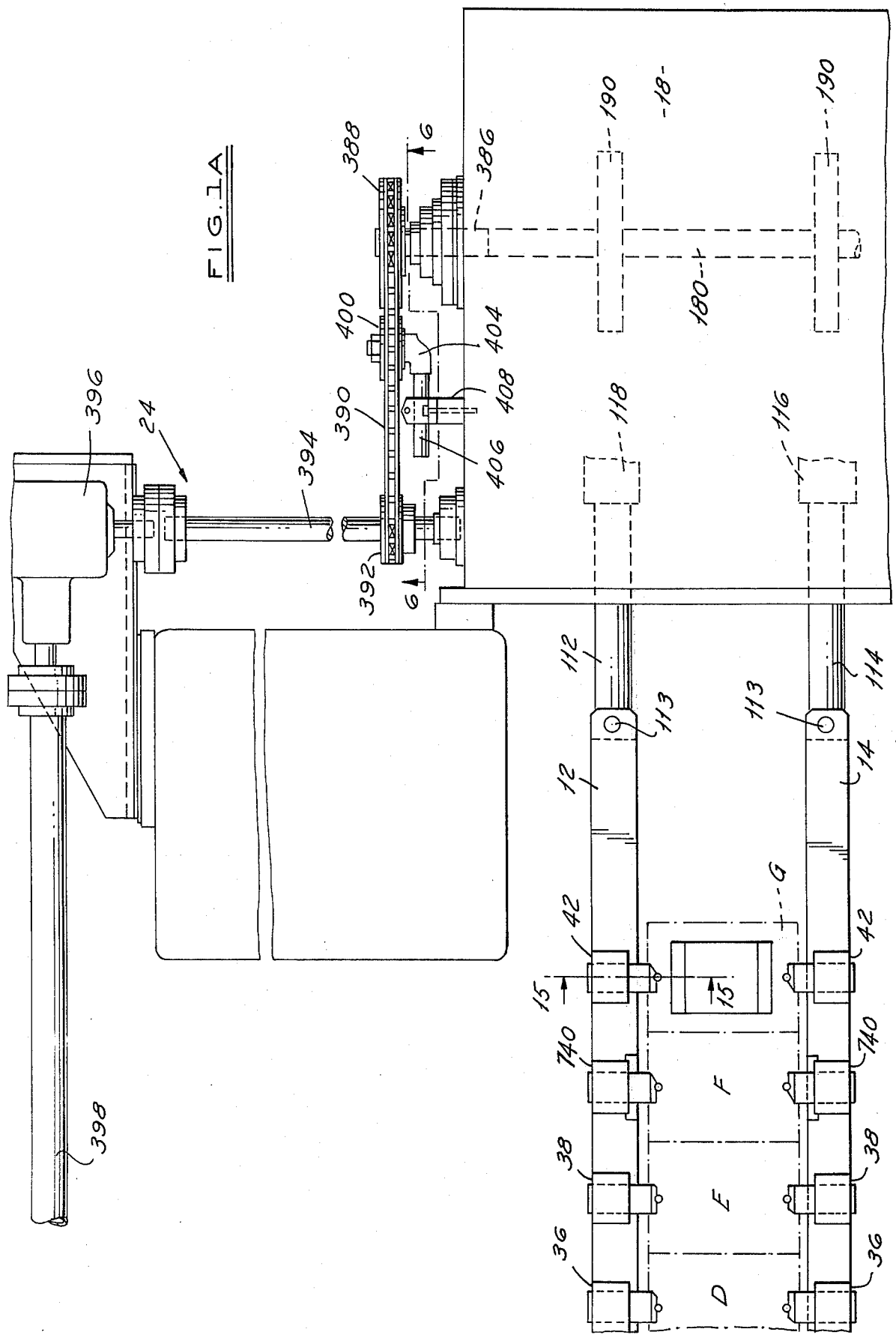
FIG. 1A is a top plan view of the remainder of the beam transfer mechanism shown in FIG. 1.

Referring now more particularly to the drawings, ans especially to FIGS. 1 and 1A, the beam transfer mechanism will be seen to comprise a pair of elongated horizontal laterally spaced beams 12 and 14, beam operating mechanism including the control units 16 and 18 at opposite ends of the beams, and a motor 20 and transmissions 22 and 24 operating from the motor to drive the two control units in synchronism.

The beams 12 and 14 extend along a row of work stations A, B, C, D, E, F, G, which in this instance are spaced apart equal distances. A fixed lower die is provided at each work station except station A, which is the loading station. The lower dies, not shown, are each cooperable with an upper die, also not shown, mounted on a vertically movable platen of a press to form a workpiece progressively from a starting blank to a finished part as it moves from station to station through the press beginning at station A and ending at station G. The work transfer mechanism of this invention is designed to simultaneously transfer the workpieces from one station to the next for successive and progressive forming into the finished part by the press dies.

Each of the beams 12, 14 has mounted thereon a plurality of work holding fixtures 30, 32, 34, 36, 38, 740 and 42 which are spaced apart equal distances corresponding to the spacing between adjacent work stations. The work holding fixtures on one of the beams are respectively disposed opposite to the correspondingly numbered work holding fixtures on the other beam. Thus the opposed correspondingly numbered work holding fixtures cooperate with one another to grip a workpiece and transfer the same during the operation of the beam transfer mechanism.

The work holding fixtures 30 are shown disposed at station A in FIG. 1. A workpiece blank 40 in the form of a bar is supported at the ends on workpiece holders 43 and 44 which are mirror images of one another and as seen in FIGS. 11 and 12 have inclined upper surfaces 46 formed with an arcuate cradle portion 48 for supporting the opposite ends of the blank 40 in substantial alignment with the work gripping portions of the fixtures 30.

The fixtures 30 each comprises a base 50 secured upon the top of one of the beams 12, 14. Base 50 has a transverse passage 52 for supporting a slide or finger 54 for horizontal movement at right angles to the direction of length of the beams. A retainer 57 secured to base 50 overlies and slidably engages the top of finger 54 near its inner end. A blank holder 58 is rigidly held in a socket 56 in the inner face of each finger. Laterally spaced lower arcuate projections 60 and laterally spaced upper projections 62 on the inner face of each blank holder 58 cooperate to define a recess for receiving and holding the end of the blank 40 supported in the cradle 48 of work holder 43 or 44.

The fingers 54 are urged in a laterally inward direction by compression springs 64 disposed within recesses 66 in the fingers and bearing at their inner ends against finger abutments 68 and at their outer ends against the abutments 70 secured to one of the beams 12, 14 and projecting into the recesses 66. The fingers 54 carry stops 72 which are adapted to contact the abutments 70 to determine the limit of inward movement of the fingers. Such stops 72 are in the form of screws threadedly engaged in the fingers for purposes of adjustment in the direction of finger movement.

As more fully described hereinafter, when the beams 12, 14 move laterally inwardly the ends of the blank 40 are received in the recesses defined by the projections 60 and 62 of the fingers 54, the spring loading of the fingers allowing them to yield slightly to accommodate blanks of differing lengths, and the blank 40 is then raised from the station A by the elevation of the bars 12, 14.

The fixtures 32, 34, 36, 38 and 740 are of the same construction. They are similar to although specifically different from the fixtures 30. As seen in FIG. 13, the fixture 34 has a base 76 mounted on the top of one of the beams 12, 14. Base 76 has a transverse passage 78 for supporting a slide or finger 80 for horizontal movement at right angles to the direction of length of the beams. A blank holder 82 in the form of a horizontal plate is rigidly secured to the inner end of and projects inwardly from the slide 80, having a recess 84 in its inner edge. The recess is for engaging the downwardly projecting part 86 formed on the blank at the second station B. The blank shown in FIG. 13 has been partially reformed and is designated 40'. Die 88 at station C will be seen to have a recess 90 for receiving the projecting part 86. An element 92 rigidly secured to the base in spaced relation above blank holder 82 will be seen to overlie the edge of the blank to contain the blank during transfer. The blank is shown elevated in FIG. 13 by ejection pins (not shown) in the lower die.

The fingers 80 are urged in a laterally inward direction by compression springs 94 disposed within recesses 96 in the fingers and bearing at their inner ends against finger abutments 98 and at their outer ends against the stops 100 secured to one of the beams 12, 14 and projecting into the recesses 96. The fingers 80 have stops 102 which are adapted to contact the abutments 100 to determine the limit of inward movement of the fingers. Such stops 102 are in the form of screws threadedly engaged in the fingers for purposes of adjustment in the direction of finger movement.

When the beams 12, 14 move laterally inwardly to the FIG. 13 position, the blank holders 82 extend under the projecting edge of the blank 40' and engage the blank projections 86 in the recesses 84. When the beams 12, 14 move up, the blank holders 82 of the fixtures 34 raise the blank away from station C. The upper die is raised after the fixtures have been moved to the FIG. 13 position and before elevation thereof so that the overlying elements 92 on the fixtures can contain the blank during transfer.

The fixtures 42 are generally similar in construction to the fixtures 32, 34, 36, 38 and 740 and accordingly similar reference characters primed are to identify the parts thereof. It will be noted in FIG. 15 however that the blank holders 82' of fixtures 42 are disposed in a lower position, being secured in recesses in the bottoms of the fingers 80', in order to clear the edge of the blank 40' as shown in FIG. 15 at station G. The element 92' is secured to the base 76' but likewise in a lower position. Otherwise the fixtures 42 may be considered as being of the same construction and operative in the same manner as the fixtures 32, 34, 36, 38 and 740.

The beams 12 and 14 have beam extensions or beam ends 112 and 114 removably secured to the ends thereof by fasteners 113 as shown n FIGS. 1 and 1A. These beam ends could be made integral with the beams, if desired. They extend into the control units 16 and 18 and are subject to the action of the control units to effect the in and out, up and down, and forward and rearward movement of the beams 12, 14.

Reference is now made particularly to FIGS. 2–5 and 7–9 for a description of the control unit 16, which is in the form of a cabinet. As there shown, the parallel beam ends 112 and 114 are slidably supported for longitudinal movement in elongated horizontal tubular carriers 116 and 118. These carriers are mounted inside the control unit for horizontal and vertical movement. Actually the support for these carriers permits them to move in other than truly horizontal and vertical directions and in fact permits universal movement with the limitation that during any such movement of the carriers they are constrained to maintain a true parallel relationship at all times. Thus each carrier will be disposed with the orientation of its axis always the same no matter what its position. In other words, the mounting of each carrier is such that its longitudinal axis in any position is parallel to its axis in any other position.

The mounting of the carriers may best be seen in FIGS. 2, 3, 4 and 7. As there shown, each carrier is pivotally supported by a linkage 120 so that the longitudinal axis of one carrier is parallel to that of the other.

Each linkage 120 includes two generally C-shaped frames 122 and 124. The frame 122 is in the form of an elongated bar 126 having parallel arms 128 and 130 at the ends of the bar which extend at right angles thereto. These arms 128 and 130 are pivoted at points remote from bar 126 on the aligned pivot pins 132 which are secured to the ends of each carrier and are parallel to the longitudinal axis of the carrier. The frame 124 has an elongated bar 134 and parallel arms 136 and 138 at the ends of the bar extending at right angles thereto. The arms 136 and 138 are pivoted at points remote from the bar 134 on the aligned pivot pins 140 secured to the ends of the bar 126 of frame 122. Pins 140 are parallel to pivot pins 132. The bar 134 of frame 124 is pivoted on aligned pivot pins 142 mounted in fixed frame portions 144 in the side walls of the control unit 16. Pins 142 are parallel to the pivot pins 132 and 140. It will be apparent from the mounting of the carriers by the linkages 120 that the parallel carriers will maintain a parallel relationship with one another throughout the full range of movement permitted by the linkages.

A shaft 150 extends between and is journaled in bearings 152 in carriers 116 and 118 to prevent the carriers from rotating on the beam extension 112 and 114. The shaft 150 extends at right angles to the carriers.

The beam extensions 112 and 114 are prevented from rotating in the carriers by the piston-cylinder assembly 156 which includes a cylinder 158 pivotally connected by transverse pin 157 to the end of beam 114 and a plunger 160 reciprocable in the cylinder and having a fitting 162 on its end pivotally connected by transverse pin 163 to the end of beam end 112. (FIGS. 2 and 4) Accordingly, the beams 12 and 14 are kept from turning and the work holding fixtures 30, 32, 34, 36, 38, 740 and 42 remain upright.

The carriers 116 and 118 are urged at all times toward one another for a purpose to be made more apparent hereinafter by a piston-cylinder assembly 164 (FIG. 4) which includes a cylinder 166 having a fitting 168 pivoted to a portion 170 of carrier 116 and a piston, not shown, reciprocable within the cylinder having a rod 172 provided with a forked end 174 pivoted to a part 176 on the carrier 118. This may, for example, be an air cylinder and air may be supplied under pressure to the rod end of the cylinder to urge the carriers toward one another.

A cam shaft 180 is disposed within the control unit 116 extending horizontally across the control unit beneath and at right angles to the carriers. The ends of the cam shaft 180 are journaled in bearings 182 and 184 mounted in the side walls of the control unit. A drive shaft 186 extends into the control unit and its end has a keyed and piloted connection indicated at 188 with one end of the cam shaft to rotate the cam shaft from the motor 20 and transmission 22 which will be more fully described hereinafter.

A pair of cams 190 are rigidly mounted on the cam shaft 180. These cams are specially formed to control the vertical and horizontal movements of the carriers and are identical to one another. They are mounted on the cam shaft in the same angular position so that the horizontally inward movement, horizontally outward movement, vertical upward movement and vertical downward movement of the two carriers 116 and 118 occur simultaneously.

Figure 18:
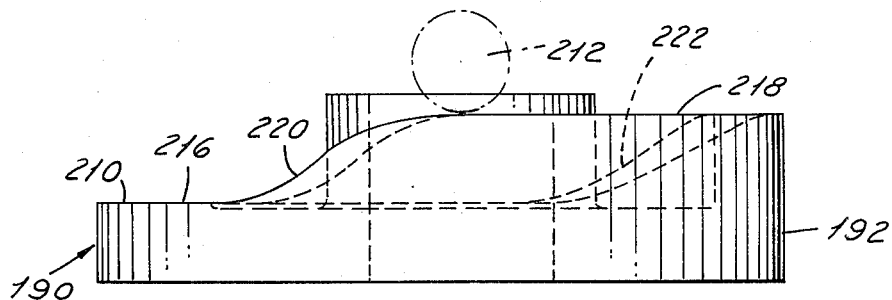
FIG. 18 is an edge view of one of the cams.
Figure 19:
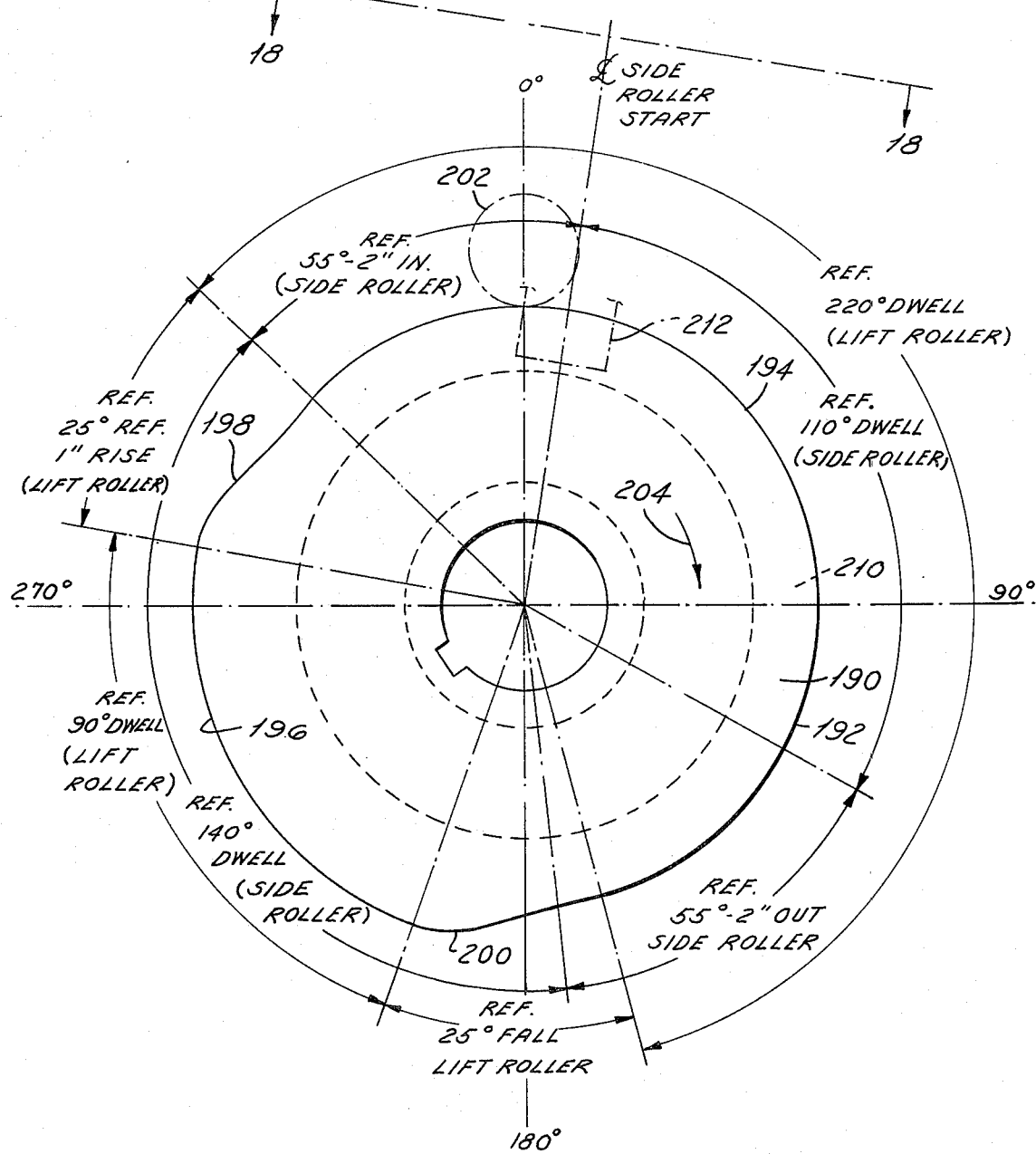
FIG. 19 is a plan view of the cam shown in FIG. 18.

One of the cams 190 is illustrated in FIGS. 18 and 19. As there shown, the cam 190 has a continuous peripheral cam surface 192 which includes an arcuate lower dwell portion 194 that is concentric with the axis of rotation of the cam and extends throughout an angle of 220° as shown. It also has an upper dwell portion 196 of arcuate form which is concentric with the axis of rotation of the cam and which extends throughout an angle of 90°. The upper dwell portion 196 is of greater radius than the lower dwell portion 194 and the two portions are connected at the ends by inclined ramp cam surface portions 198 and 200. The ramp portion 198 of the cam surface 192 extends through an arc of 25° as does the ramp portion 200. The difference in radius between the two arcuate portions 194 and 196 of the cam surface 192 may vary but a suggested difference in radius is one inch so as to raise the beam carriers 116 and 118 and hence the beam ends 112 and 114 a distance of one inch to correspondingly raise the work gripping fixtures 30–42 on the beams 12 and 14 from their lower to their upper positions. Each carrier has a cam follower or lift roller 202 which rides on the cam surface 192 to raise and lower the carriers in accordance with the contour of cam surface 192 and in response to rotation of the cam shaft in the direction of the arrow 204.

Each cam 190 also has a lateral annular cam surface 210 on the outer side face thereof adjacent its periphery. The cam follower or side roller 212 on each carrier engages the lateral cam surface 210 so as to move the carrier laterally in and out or toward and away from the other carrier in accordance with the contour of the cam surface 210 and in response to rotation of the cam in the direction of the arrow 204.

The cam surface 210 includes two arcuate cam surface portions 216 and 218 each of which extends in a plane normal to the axis of rotation of the cam. The arcuate surface portion 216 is the inner dwell surface portion and extends throughout a distance of 140°. The arcuate surface portion 218 is the outer dwell surface portion and extends throughout an arc of 110°. Inclined ramp portions 220 and 222 connect the ends of the dwell portions 216 and 218 and each extends throughout an angle of 55°. The lateral distance between the planes of the dwell surface portions 216 and 218 may vary depending upon the desired amount of lateral movement of the carriers 116 and 118 and hence of beam ends 112 and 114, but in the present instance a distance of two inches is suggested to produce a lateral movement of each beam end 112 and 114 of two inches and hence a total relative movement of the two carriers 116 and 118 four inches toward and away from each other. The piston-cylinder assembly 164 which at all times urges the carriers toward one another holds the roller follows 212 in contact with the cam surfaces 210 of the cams 190.

Figure 3:
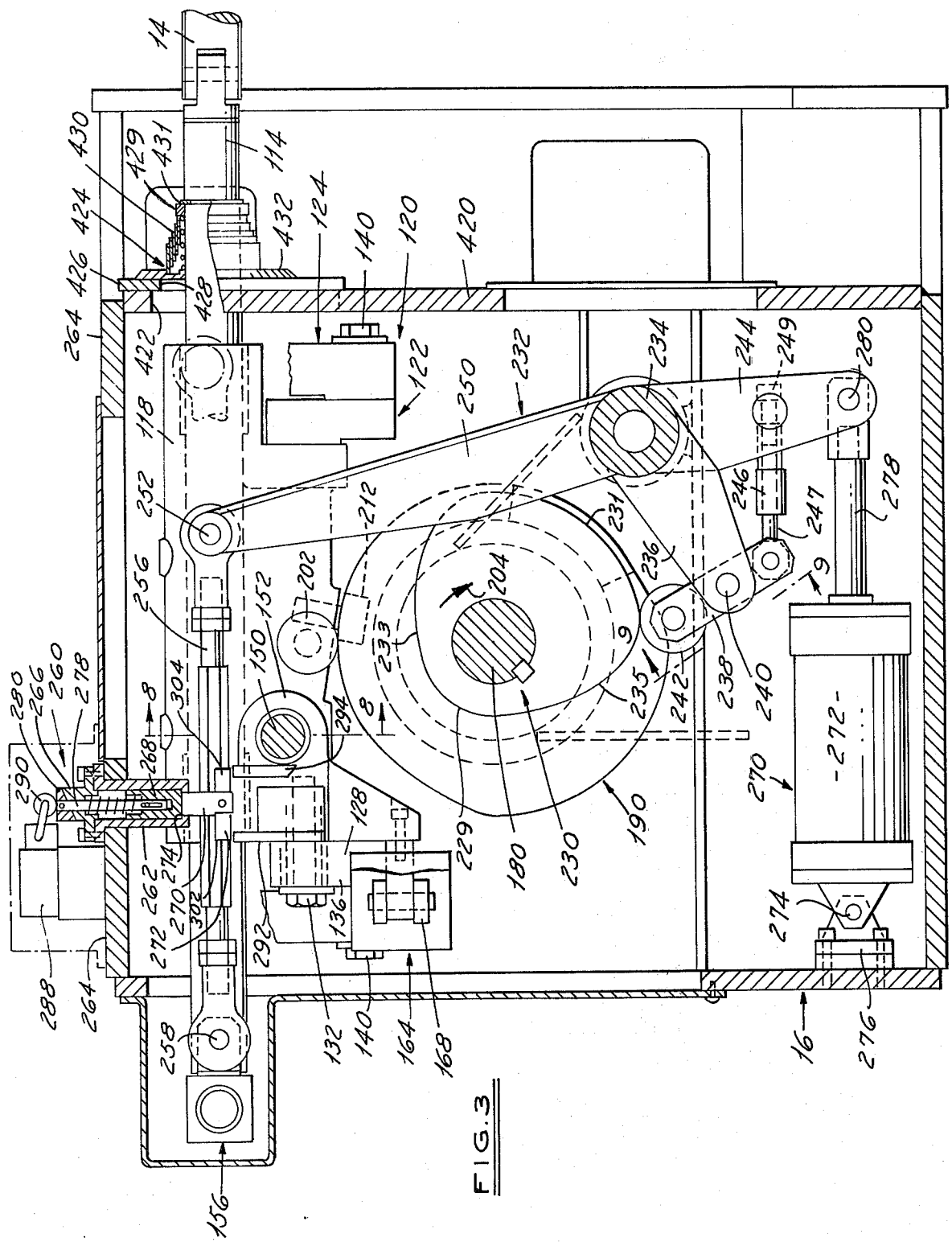
FIG. 3 is a sectional view taken on the line 3—3 in FIG. 2.

Also mounted on the cam shaft between the cams 190 is a third cam 230 having the form shown in FIG. 3 for determining the longitudinal movement of the beams relative to the carriers. The carriers are not moved longitudinally by cam 230, but rather the beam ends 112 and 114 are caused to slide in the carriers. The periphery of cam 230 has an arcuate rearward dwell portion 231 of relatively large radius, and arcuate forward dwell portion 229 of relatively small radius, and inclined ramp portions 233 and 235 connecting the two dwell portions. As shown in FIG. 3, a bell crank lever 232 is pivoted on a transverse horizontal shaft 234 mounted in the control unit 16 in bearings 237. One arm 236 of the bell crank 232 has a lever 238 pivoted at 240 to its outer end. A cam follower or roller 242 is pivoted to one end of the lever 238 and engages the periphery of the cam 230. The other end of the lever 238 is connected to a second arm 244 of the bell crank lever by a rigid yet adjustable connecting link 246. The link 246 may for example be a simple turnbuckle type assembly consisting of members 247 and 249 threaded together and respectively pivoted to lever 238 and arm 244 for lengthening or shortening the link 246 to adjust the position of the roller follower 242. After adjustment, the link 246 remains at a given length as shown in FIG. 3 to maintain the position of the roller follower 242 in fixed relation to the bell crank arm 236.

The bell crank lever 232 has a third arm 250 terminating in a transverse end portion 252 to the ends of which are pivotally connected the rods 254 and 256. The rods 254 and 256 are pivotally connected at their opposite ends by pins 258 to the terminals 260 formed respectively on the fitting 262 and the cylinder 258 of the piston-cylinder assembly 256 which connects the ends of the beam ends 112 and 114.

The cam 230 has the peripheral contour shown in FIG. 3 so that upon rotation of the cam shaft in the direction of the arrow 204 the beam ends 112 and 114 and hence the beams 12 and 14 will be moved longitudinally a distance corresponding to the distance between work stations of the press. The approximate extent of the longitudinal movement can be seen in FIG.

3 from the position of the forward end portions of the rods 254 and 256 shown in both solid and dotted lines. When the roller follower 242 rides on the rearward dwell portion 231 of the cam, the beams are at the rearward position of FIG. 3, and when it rides on the forward dwell portion 229 the beams are at the forward portion to the right of the FIG. 3 position.

A piston-cylinder 270 is provided in order to hold the roller follower 242 in continuous engagement with the periphery of the cam 230. The cylinder assembly 270 includes a cylinder 272 pivoted at 274 to a support 276 fixed to a wall of the control unit 16 and a piston, not shown, therein having a piston rod 278 pivoted at 280 to the lower end of the bell crank arm 244. Air or other fluid medium may be used to apply a constant pressure against the rod end of the cylinder assembly 270 to urge the bell crank lever 232 in a clockwise direction and thereby hold its roller follower 242 in contact with the periphery of cam 230.

A safety device 260 is provided to cut off the power to the motor 20 in the event that the carriers 116 and 118 do not follow exactly the paths of movement defined for them by the cams 190. As noted previously, the carriers during a cycle of movement move laterally inwardly to cause the work holding fixtures 30–42 to grip the workpieces at the several stations and then move vertically upwardly to lift the workpieces away from the stations. After the beams are moved longitudinally in a forward direction to move the workpiece the distance of one station, the carriers move vertically downwardly and then laterally outwardly. It is possible for a workpiece to become jammed at one of the stations or to become hung up in a die for example, preventing full inward movement of the carriers of full downward movement thereof. The safety device 260 is designed to shut off the motor 20 in the event of such a malfunction in the cycle.

The safety device 260 shown in FIGS. 2–4 and 17 comprises a vertical tubular sleeve 262 mounted on the top wall 264 of the control unit 16. A cap 266 is secured on top of the sleeve 262 and has a vertical cylindrical passage 267 of smaller diameter than but aligned with the cylindrical inner wall 269 of the sleeve. A cylindrical plunger 268 is vertically reciprocable and rotatable in the sleeve and has an extension 270 extending downward through the lower end of the sleeve which is of reduced diameter relative to the plunger and which has a transverse paddle or blade 272 at the lower end which projects in opposite directions from the plunger extension at right angles thereto to form therewith an inverted T shape. The sleeve 262 has an inturned flange at its lower end providing a shoulder 274 engageable with the lower end of the plunger 268 to limit the downward movement of the plunger to the position shown in FIG. 3.

The plunger has an axially extending cylindrical socket 276 in its upper end which slidably receives the lower end of a cylindrical pin 278. Pin 278 extends upwardly through the passage 267 in cap 266 and is capable of reciprocating and rotating therein. A cam 280 is secured to the upper end of pin 278 and has an inclined flat bottom cam surface 281 on its underside engageable with a similarly inclined flat top cam surface 283 at the top of the cap 266. The cam surfaces 281 and 283 are normally in full surface contact as in FIG. 3.

A compression coil spring 284 surrounding the pin is compressed between the cap 266 and the plunger 268 to urge the plunger downwardly to its lower limit seen in FIG. 3. A lost motion connection between the pin 278 and plunger 268 is provided comprising a transverse pin 285 secured to the plunger and extending through an elongated axially extending slot 286 in the pin. Thus the pin 278 can move longitudinally relative to the plunger but turns as a unit therewith. When the plunger is in its down position as shown in FIG. 3 and the pin 278 is turned as in FIG. 3 so that its bottom cam surface rests flat upon the top cam surface of the cap 266, a slight clearance exists between the lower end of the pin 278 and the bottom of the socket 276 in the plunger.

The safety device 260 includes a normally open shut-off switch 288 having a spring-loaded arm 290 pressing upon the upper end of the pin 278. The switch 288 is normally closed but is opened to open the circuit to the motor 20 and shut it off in the event that the pin 278 is raised from the position shown in FIG. 3 to lift the spring-loaded arm 290 of the switch.

Figure 4:
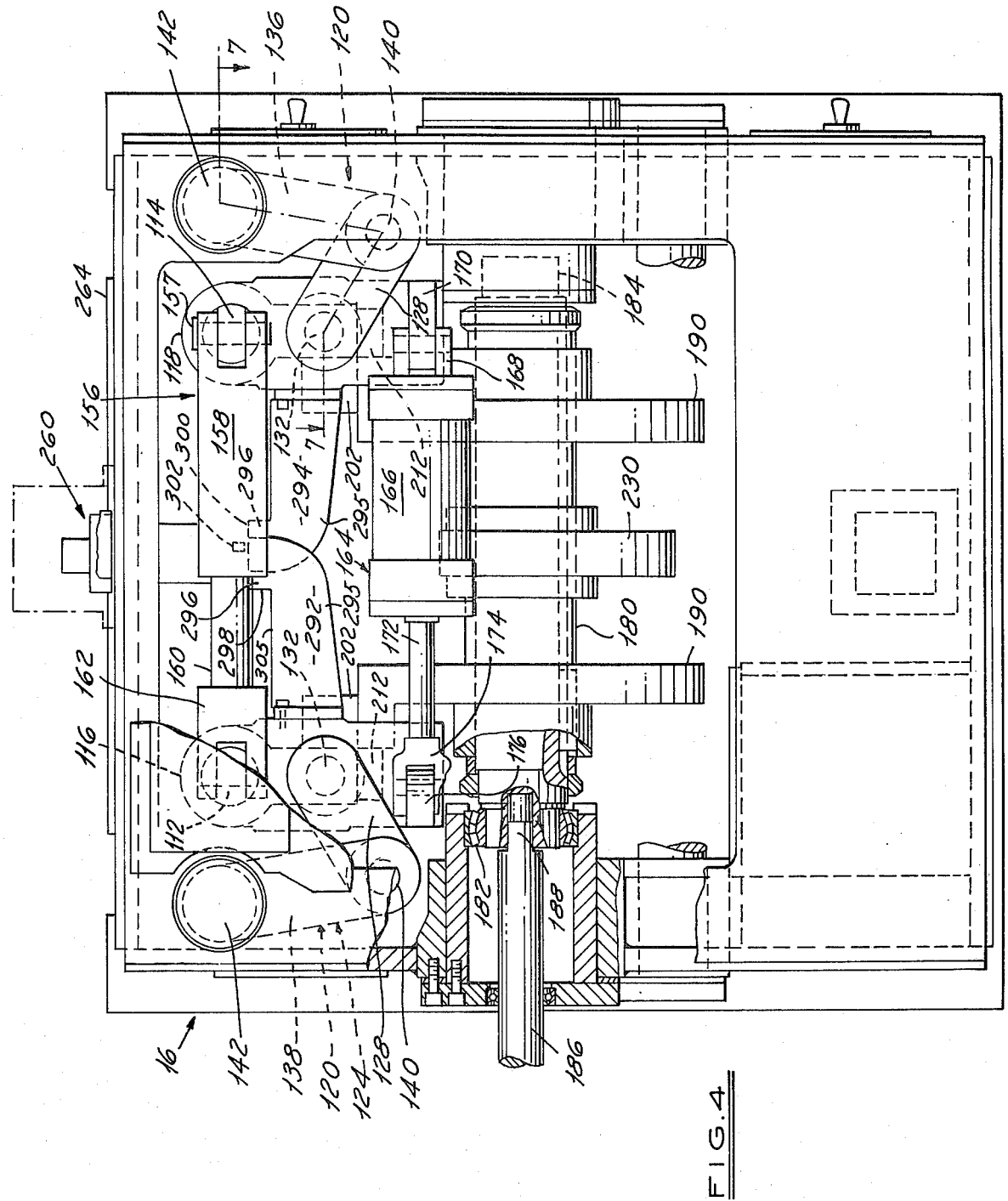
FIG. 4 is an end view with parts broken away and in section of the control unit shown in FIG. 2 as viewed from the left.

Each carrier will be seen to have a generally L-shaped plate 292, 294. Each plate extends in a vertical plane at right angles to its carrier and has an elongated main body portion 295 extending laterally toward the other carrier as shown in FIG. 4. Each plate has a vertically upwardly extending arm 296 which is provided with operating surfaces 298 and 300. The surface 298 is a vertical surface on the edge of the arm 296 nearest the carrier to which the plate is attached, and the surface 300 is a horizontal surface along the upper edge of the arm 296.

The plates 292 and 294 are longitudinally spaced from one another as seen in FIG. 2 and are disposed beneath the ends 302 and 304 of the paddle 272 of the safety device in the normal position of the latter. FIG. 4 shows the position of the end 302 of paddle 272 in relation to the plate 292 when the carriers are in their lowermost and outermost positions. As seen, the end 302 of the paddle overlies the top edge 300 of the arm 296 of the plate 292 adjacent its extremity remote from the carrier 116 to which it is attached. The end 304 of the paddle is not shown in FIG. 4 but will be understood to overlie the top edge 300 of the arm 296 of the plate 294 in the same relation thereto as the end 302 bears to the top edge of the arm 296 of the plate 292.

If the horizontal and vertical movements of the carrier 116 follow the exact paths established for them by the cam 190, the plate 292 will move horizontally inwardly from the FIG. 4 position far enough that the upper edge 300 of the arm 296 thereof clears the paddle end 302 and will then move vertically upwardly so that the vertical edge 298 of the arm 296 moves alongside the paddle 304. The carrier 116 is not moved upwardly a sufficient distance however to cause the upper edge 305 of the plate 292 to contact the paddle end 302. The following vertical downward and horizontally outward movement of the carrier 116 retraces the path of the inward and upward movement so that no portion of the plate 292 contacts the paddle end 302 and hence the safety device is not actuated.

If, however, the carrier 116 should not move inwardly a sufficient distance that the arm 296 thereof clears the paddle end 302, on the subsequent upward movement of the carrier the top edge 300 of the arm 296 of the plate 292 will engage the paddle end 302 lifting the paddle and the plunger 268 to take up the slight lost motion between the plunger and pin 278 and then raise the pin to lift the spring loaded arm 290 and switch 288 to the motor 20, thus shutting off the transfer mechanism. After the malfunction has been corrected, the spring 284 will return plunger 268 to its FIG. 17 position, and the pressure of switch arm 290 will return pin 278 to its FIG. 17 position.

As another way in which the safety device may be operated, if following the inward and upward movement of the carrier 116 through its proper path established by cam 190 the carrier should move downwardly but not sufficiently far to dispose the arm 296 of plate 292 at a lower level than the paddle end 302, upon the subsequent lateral outward movement of the carrier 116 the vertical surface 298 of arm 296 will contact paddle end 302 to rotate the paddle and plunger 268. The pin 278 is also rotated with the plunger by the pin and slot connection 285, 286 therebetween, causing the cam 280 to rotate on top of cap 266. The cam surfaces 281, 283 between the cam 280 and cap 266 causes the pin 278 to rise, lifting the spring-loaded arm 290 of switch 288 to open the latter and cut off the power to motor 20. The pin and slot connection between the pin 278 and plunger 268 permits the pin 278 to be raised relative to the plunger. When the malfunction has been corrected, the pressure of switch arm 290 tends to rotate and lower pin 278 to its FIG. 17 position. If the slope of the contacting cam surfaces of cam 280 and cap 266, under the pressure of switch arm 290, is not sufficient to return the pin 278 to the rotative position shown in which its cam surface lies flush with that of the cap, the pin 178 may be manually rotated to the illustrated position of FIG. 17 to reset the safety device, at the same time returning the plunger 268 to the FIG. 17 position because of the pin and slot connection 285, 286.

The other control unit 18 is exactly like the control unit 16 except that it does not have any means for longitudinally reciprocating the beams 12 and 14, that is it does not have a cam 230, bell crank lever 232, rods 254 and 256 and associated mechanism. Accordingly, FIGS. 2–5, 7–9 and 17–19 which show the control unit 16 and portions thereof, may be considered as also illustrative of the control unit 18, with the understanding the unit 18 does not have any mechanism for reciprocating the beams. It is sufficient and in fact preferred that the longitudinal movement of the beams be effectd through mechanism provided in one only of the control units. However, as stated the control unit 18 includes all of the other apparatus of control unit 16 heretofore described, including the beam end carriers, supports for the carriers, safety shutoff and cams to move the opposite beam ends horizontally in and out and vertically up and down in the same manner and at the same time as the beam ends acted upon by the control unit 16. The carriers 116, 118 in control unit 18 are at all times aligned with the correspondingly numbered carriers in control unit 16.

The transmission 22 shown in FIG. 1 includes the transmission shaft 186 which drives cam shaft 180 of control unit 16. Shaft 186 has a sprocket 375 driven from sprocket 377 by chain 379. Gear box 381 drives sprocket 377, and is driven by the output shaft 383 of motor 20.

The transmission 24 shown in FIG. 1A has a transmission shaft 386, corresponding to the transmission shaft 186 of transmission 22 which drives cam shaft 180 in control unit 16, for driving the cam shaft of the control unit 18. The transmission shaft 386 has on it a sprocket 388 driven by a chain 390 from a pulley 392 on transmission shaft 394. The transmission shaft 394 is driven from the gear box 396 which is operated by motor 20 from motor output shaft 398. Two idler sprockets 400 and 402 are provided for the belt 390. These idlers are rotatably supported on mounts 404 which have threaded rods 406 threadedly engaging brackets 408 secured to the side wall of the control unit 18. The threaded rods 406 are removably, rigidly connected to the supports 404. The rods 406 are axially adjustable relative to brackets 408 by rotation so as to correspondingly shift sprockets 400, 402 either to take up or produce slack in the chain 390. Two such idlers are provided, one for each reach of the chain, to adjust the synchronism of the mechanism in the control unit 18 with that in the control unit 16. If, for example, both sprockets 400 and 402 are moved to the right, the slack produced over sprocket 400 would be taken up by that portion of the chain extending over sprocket 402 to produce an increment of rotation of transmission shaft 386 relative to transmission shaft 394 and accordingly advancing or retarding the cam shaft in the control unit 18 relative to the cam shaft in control unit 16. An adjustment of this kind is made when setting up the apparatus so that the carriers in both control units move horizontally in and out and vertically up and down in exact synchronism with each other.

Figure 5:
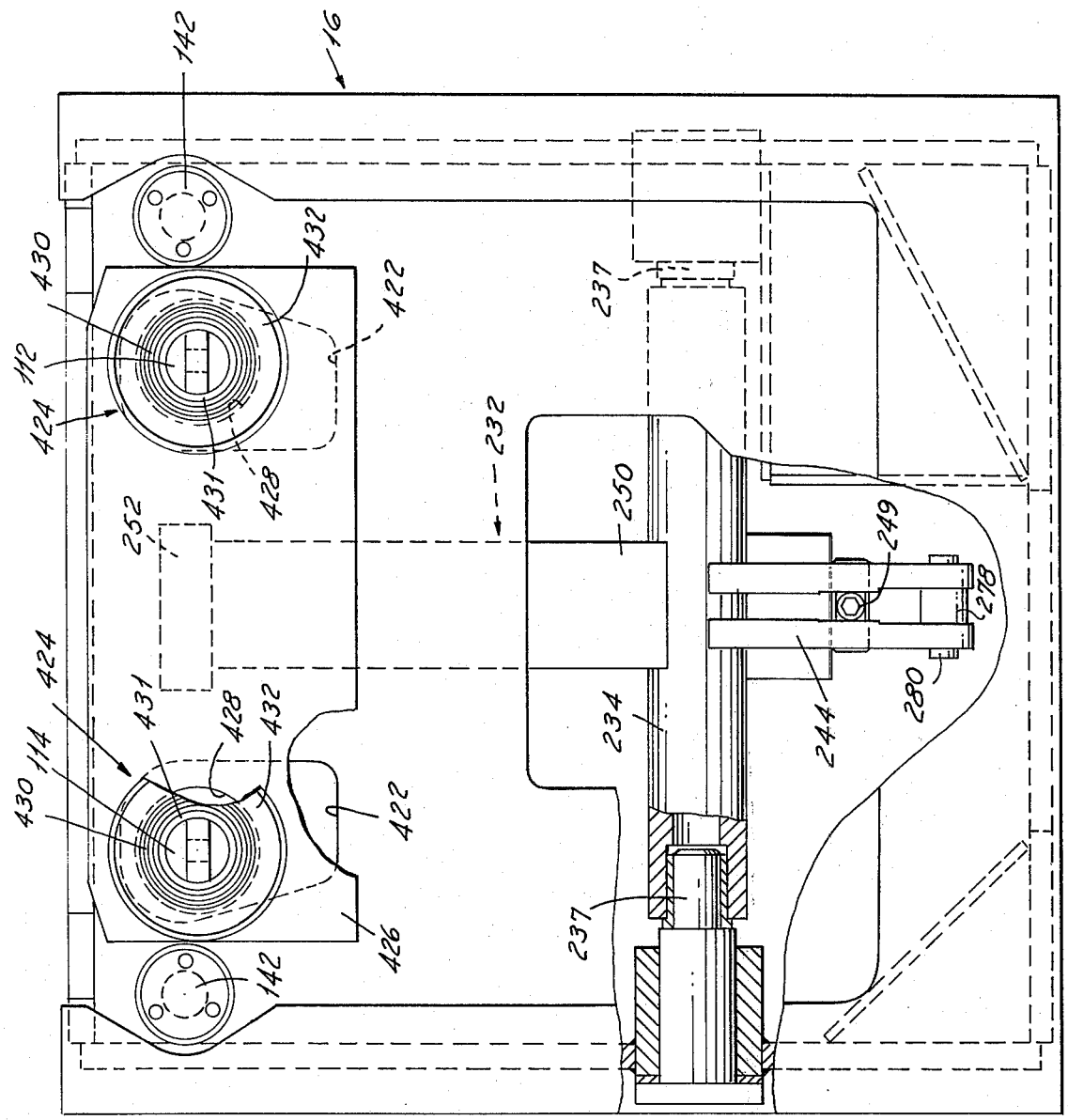
FIG. 5 is an end view with parts broken away and in section of the control unit shown in FIG. 3, as viewed from the right.

The front or adjacent wall 420 of control unit 16, which is recessed as seen in FIG. 3, has openings 422 through which the rod ends 114 and 116 of the beams extend. These openings are enlarged as shown in FIG. 5 to permit the vertical and horizontal movements of the beam ends and are sealed by sealing means 424 which prevent dirt from entering the control unit. The sealing means 424 for the control unit 16 comprises a plate 426 secured to the outer surface of the front wall 420 over the openings 422. This plate 426 has two circular openings 428 which are large enough to permit the vertical and horizontal movements of the beam ends 112 and 114. It will be understood that the control unit 18 may have a similar front wall construction and sealing means for the beam ends associated therewith.

The sealing means 424 also includes a helically wound axially compressed spring strip 430 encircling each beam end 112, 114. Each spring strip is a self-expanding helix in which succeeding turns are in radial surface-to-surface contact to exclude dirt. As seen in FIG. 3, the small end of the spring strip is compressed against collar 429 retained by a snap ring 431 held in a groove in the beam end, and the large end is engaged in an annular recess in a sealing plate or ring 432 which encircles the beam end. The sealing rings 432 are pressed by spring strips against the fixed plate 426 and overlie the holes 428 in the fixed plate through which the beam ends extend. The strips 430 are, by virtue of their wound spring construction, capable of self-expanding lengthwise to coincide with and follow the longitudinal movement of the beams while all the time holding the rings 432 sealed over the openings 428 in plate 426. Even when the spring strips expand lengthwise as the beam moves longitudinally to its opposite limit, the successive turns of the strip remain overlapped to exclude dirt. As the beam ends move laterally and vertically, the wound spring strips 430 cause the rings 432 to slide on the fixed plate 426 to follow such movements of the beam ends but keeping the openings 428 covered at all times.

Figure 6:
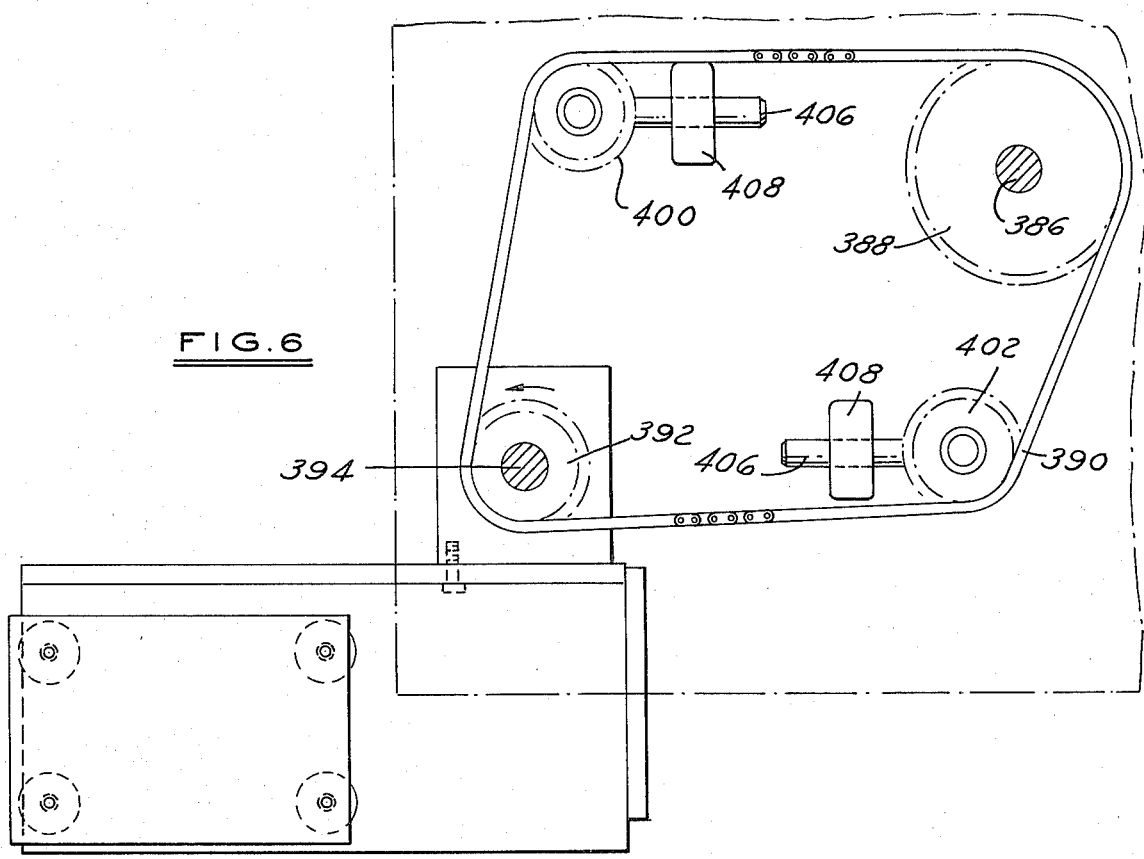
FIG. 6 is a view partly in elevation and partly in section taken on the line 6—6 in FIG. 1A.
Figure 10:
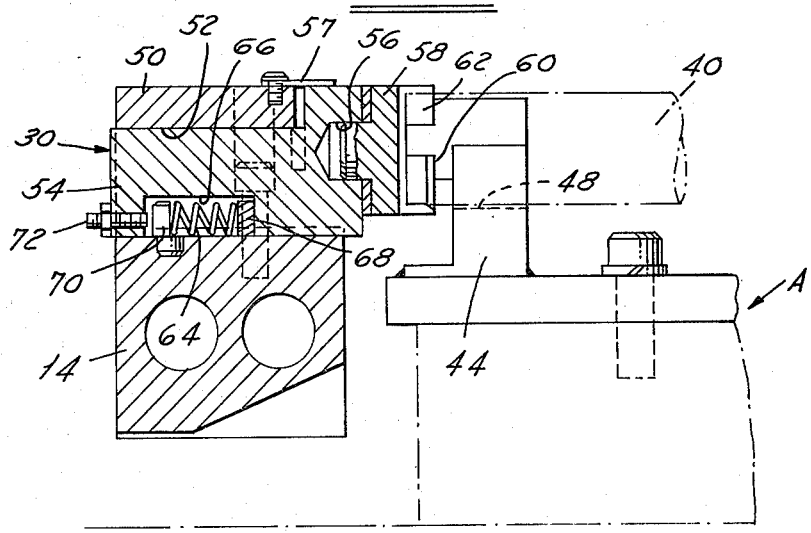
FIG. 10 is a fragmentary sectional view taken on the line 10—10 in FIG. 1.
Figure 8:
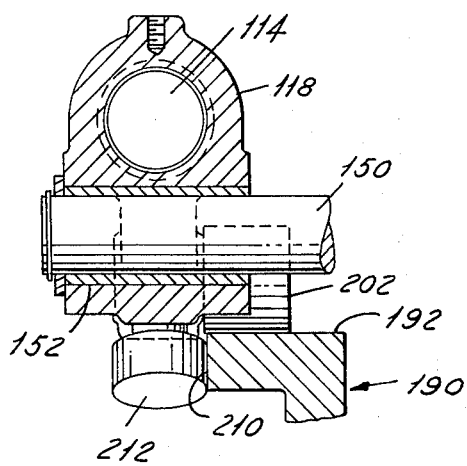
FIG. 8 is a fragmentary sectional view taken on the line 8—8 in FIG. 3.
Figure 9:
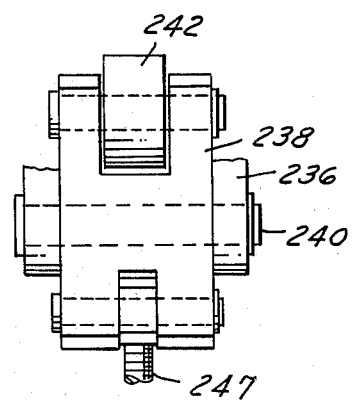
FIG. 9 is a fragmentary detail view taken in the direction of the arrow 9 in FIG. 3.
Figure 7:
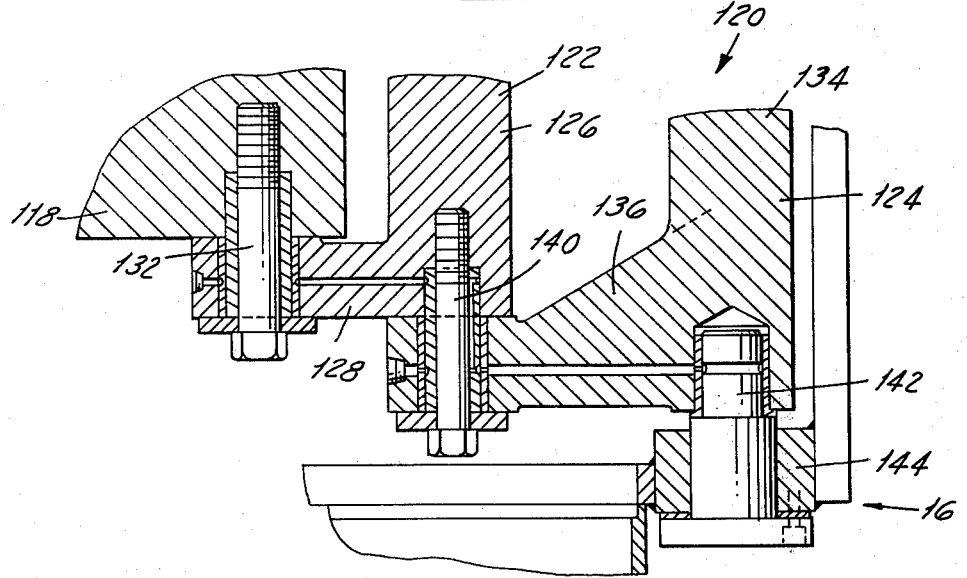
FIG. 7 is a fragmentary sectional view taken on the line 7—7 in FIG. 4.

It should be clear from the foregoing the manner in which the beam mechanism is operated to advance workpieces through a press from station to station one step at a time. The two control units are initially adjusted so that they are operative in exact synchronism with one another. In other words, they are adjusted so that at the particular instant in time shown in FIG. 3, which view is taken from the bottom of the sheet in FIG. 1, the cam shaft of control unit 18, if seen from the top of the sheet in FIG. 1A in a view similar to FIG. 3, would be seen turned to the exact same relative position as the cam shaft in FIG. 3, and cams 190 thereof would bear the same relationship to the carrier roller followers. This adjustment is accomplished by shifting both idlers 400, 402 either left or right in FIG. 6. If they are shifted to the right, the slack resulting in the upper reach is taken up in the lower reach, producing a clockwise adjustment of transmission shaft 386. If the idlers are both shifted to the left, a counterclockwise adjustment of the transmission shaft 386 results.

The beams and internal parts of the control unit 16 are shown in FIGS. 2–4 in their positions at the beginning of a cycle when the beam carriers 116 and 118, and hence the beams, are in their lowermost and outermost positions. It will be understood that the carriers for the opposite beam end in control unit 18 are likewise in the lowermost and outermost positions. The beams are at the leftmost positions under the control of cam 230 in control unit 16. At this time, the carrier lift rollers 202 are engaging the lower dwell portions 194 of the cam surfaces 192 of cams 190, the carrier in-out rollers 212 are engaging the outer portions 218 of the cam surfaces 210 of the cams 190 and the roller 242 for longitudinally moving the beams 14 and 16 is engaging the high portion 231 of the cam 230, as shown in FIG. 3.

The beams 12 and 14 are first moved inwardly to the positions of FIGS. 1 and 1A as the cam shafts 180 of the two control units 16, 18 rotate in the direction of arrow 204. This inward movement is caused by the in-out rollers 212 of the carriers riding down the ramps 220 to the inner dwell portions 216 of the cam surfaces 210 of cams 190. At such inner positions of the beams, the opposed fixtures 30 to 42 on the two beams grip the ends of blanks at the several stations as viewed in FIGS. 1 and 1A, and 10–16.

As the cam shafts 180 continue to rotate, the carrier lift rollers 202 ride up the ramps 198 to the upper dwell portions 196 of cam surfaces 192 of cams 190 to lift the carriers and thereby also lift the beams and the gripped workpieces from their respective stations.

After the beams have been raised, the roller 242 rides down the ramp 233 of the cam 230 to turn the bell crank lever 232 clockwise in FIG. 3 advancing the beams 12 and 14. When the roller 242 reaches the low point 229 of the cam 230, the beams have been advanced the distance of one station, likewise advancing the workpieces one station.

Thereafter the lift roller 202 runs down the ramp 200 of the cam surfaces 192 of cams 190 to the low dwell cam surface portions 194 to lower the beams and thereby deposit the workpieces one station advanced from the stations where they were picked up.

Thereafter the in-out roller 212 runs up the ramp portions 222 of cam surfaces 210 of cams 190 to the outer dwell cam surface portions 218 to return the beams to their outermost positions, releasing the workpieces at the stations where they have been deposited. In the outermost positions of the beams, the work holding fixtures 30, 32, 34, 36, 38, 740 and 42 shown in FIGS. 10–16 are withdrawn clear of the work.

Next the roller 242 runs up the ramp portion 235 of cam 230 to return to the high portion 231 thereof and accordingly turn the bell crank lever 232 counterclockwise and thus longitudinally move the beams 12 and 14 back to their starting positions ready for the next cycle of operation.

After the beams have returned to their starting positions, the press platen may be lowered to form and trim the workpieces at the stations B–F between upper dies carried by the platen and lower dies located at those stations. Preferably the beams subsequently move in in the first movement of the next cycle before the platen is raised so that the plates 92 on fixtures 34, 36, 38 and 740 and the plates 92' on fixtures 42 will overlie the lips of the workpieces as in FIGS. 13 and 15.

What I claim as my invention is:

1. In a beam transfer mechanism for moving workpieces which comprises an elongated beam, workpiece-engaging fixtures on said beam, a carrier axially slidably supporting said beam, and means for moving said carrier laterally and for raising and lowering the same to correspondingly move said beam, the improvement comprising support means supporting said carrier for universal movement while maintaining its axis parallel in all positions throughout such movement, said support means comprising a first frame pivoted to said carrier on a first axis laterally spaced from and parallel to the axis of said carrier, a second frame pivoted to said first frame on a second axis laterally spaced from and parallel to said first axis, and means pivotally mounting said second frame on a third axis laterally spaced from and parallel to said second axis.

2. Transfer mechanism for moving workpieces step by step along a row of stations, comprising a pair of laterally spaced beams extending parallel to said row of stations, workpiece holding fixtures on each beam spaced apart distances corresponding to the distance between stations, the fixtures on one beam being respectively opposed to those on the other beam so that each pair of opposing fixtures is cooperable to grip a workpiece, a carrier supporting each end of each beam for longitudinal sliding movement, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving said beams longitudinally after they have been raised to advance each workpiece gripped by opposing fixtures to the next station in the row, said beam operating mechanism including a control unit adjacent each end of said beams, each control unit having first means operable to laterally move said carriers, each control unit having second means operable to raise and lower said carriers, said first and second means comprising rotatable cams beneath said carriers having cam surfaces engageable with followers on said carriers to provide a free-floating support for said carriers by said cams, one of said control units having third means to move said beams longitudinally relative to said carriers, said cams of said one control unit being laterally spaced apart, said third means comprising linkage between said first-mentioned cams of said one control unit operably connected to said beams, and another cam between said first-mentioned cams of said one control unit having a cam surface engageable with a follower on said linkage.

3. The transfer mechanism defined in claim 2 including means for preventing rotation of said beams about their longitudinal axes comprising a cross-shaft connecting said beams.

4. Transfer mechanism for moving workpieces step by step along a row of stations, comprising a pair of laterally spaced beams extending parallel to said row of stations, workpiece holding fixtures on each beam spaced apart distances corresponding to the distance between stations, the fixtures on one beam being respectively opposed to those on the other beam so that each pair of opposing fixtures is cooperable to grip a workpiece, a carrier supporting each end of each beam for longitudinal sliding movement, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving said beams longitudinally after they have been raised to advance each workpiece gripped by opposing fixtures to the next station in the row, said beam operating mechanism including a control unit adjacent each end of said beams, each control unit having first means operable to laterally move said carriers, each control unit having second means operable to raise and lower said carriers, said first and second means comprising a pair of cams, a horizontal, transverse shaft extending at right angles to said beams and rotatably mounting said cams in side-by-side relation beneath said carriers, each cam having an endless peripheral surface, each cam having an endless side surface on the side thereof remote from the other cam, a pair of first followers on said carriers respectively bearing downwardly against said peripheral surfaces of said cams and a pair of second followers on said carriers respectively bearing laterally inwardly against said side surfaces of said cams, said first followers being held in engagement with said peripheral surfaces by gravity and said second followers being held in engagement with said side surfaces by pressure applying means to provide a free-floating support for said carriers by said cams, and one of said control units having third means to move said beams longitudinally relative to said carriers.

5. In a beam transfer mechanism for moving workpieces which comprises an elongated beam, workpiece-engaging fixtures on said beam, a carrier axially slidably supporting said beam, and means for moving said carrier laterally and for raising and lowering the same to correspondingly move said beam, the improvement comprising support means supporting said carrier for universal movement while maintaining its axis parallel in all positions throughout such movement, said support means comprising a first generally C-shaped frame having the legs thereof pivoted to said carrier on spaced aligned axes laterally spaced from and parallel to the axis of said carrier, a second generally C-shaped frame having the legs thereof pivoted to said first generally C-shaped frame on spaced aligned axes laterally spaced from and parallel to said first-mentioned aligned axes, and means pivotally mounting said second generally C-shaped frame on fixed aligned axes laterally spaced from and parallel to said second-mentioned aligned axes.

6. Transfer mechanism for moving workpieces step by step along a row of stations, comprising a pair of laterally spaced beams extending parallel to said row of stations, workpiece holding fixtures on each beam spaced apart distances corresponding to the distance between stations, the fixtures on one beam being respectively opposed to those on the other beam so that each pair of opposing fixtures is cooperable to grip a workpiece, a carrier supporting each end of each beam for longitudinal sliding movement, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving said beams longitudinally after they have been raised to advance each workpiece gripped by opposing fixtures to the next station in the row, said beam operating mechanism including a control unit adjacent each end of said beams, each control unit having first means operable to laterally move said carriers, each control unit having second means operable to raise and lower said carriers, one only of said control units having third means to move said beams longitudinally relative to said carriers, each control unit having a rotatable cam shaft provided with cams, said first and second means comprising separate cam surfaces on certain of said cams engageable with followers on said carriers, said third means comprising a cam surface on another of said cams engageable with a follower operably connected to said beams, means for driving said cam shafts in synchronism, said driving means including a motor, a first transmission from said motor to one of said cam shafts and a second transmission from said motor to the other of said cam shafts, and adjusting means for said first transmission for advancing or retarding the cam shaft it drives relative to the other cam shaft.

7. The transfer mechanism defined in claim 6, wherein said first transmission comprises a rotatable member driven by said motor and a second rotatable member driving one of said cam shafts, a flexible linear member extending over said rotatable members, said adjusting means including idlers respectively engaging both reaches of said linear member, and means for adjustably mounting each idler to lengthen or shorten the reach it engages making it possible thereby to lengthen one reach of said linear member while shortening the other and vice versa.

8. Transfer mechanism for moving workpieces step by step along a row of stations, comprising a pair of laterally spaced beams extending parallel to said row of stations, workpiece holding fixtures on each beam spaced apart distances corresponding to the distance between stations, the fixtures on one beam being respectively opposed to those on the other beam so that each pair of opposing fixtures is cooperable to grip a workpiece, a carrier supporting each end of each beam for longitudinal sliding movement, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving said beams longitudinally after they have been raised to advance each workpiece gripped by opposing fixtures to the next station in the row, said beam operating mechanism including a control unit adjacent each end of said beams, each control unit having first means operable to laterally move said carriers, each control unit having second means operable to raise and lower said carriers, one only of said control units having third means to move said beams longitudinally relative to said carriers, each control unit having a power input shaft for operating the same, means for driving said power input shafts in synchronism to correspondingly operate said control units, said driving means including a motor, a first transmission from said motor to one of said input shafts and a second transmission from sais motor to the other of said input shafts, and adjusting means for the first transmission to advance or retard the input shaft it drives relative to the other input shaft.

9. The transfer mechanism defined in claim 8, wherein said first transmission comprises a rotatable member driven by said motor and a second rotatable member driving one of said input shafts, a flexible linear member extending over said rotatable members, said adjusting means including idlers respectively engaging both reaches of said linear member, and means for adjustably mounting each idler to lengthen or shorten the reach it engages making it possible thereby to lengthen one reach of said linear member while shortening the other and vice versa.

10. Transfer mechanism for moving workpieces step by step along a row of stations, comprising a pair of laterally spaced beams extending parallel to said row of stations, workpiece holding fixtures on each beam spaced apart distances corresponding to the distance between stations, the fixtures on one beam being respectively opposed to those on the other beam so that each pair of opposing fixtures is cooperable to grip a workpiece, a carrier supporting each end of each beam for longitudinal sliding movement, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving said beams longitudinally after they have been raised to advance each workpiece gripped by opposing fixtures to the next station in the row, said beam operating mechanism including a control unit adjacent each end of said beams, each control unit having first means operable to laterally move said carriers, each control unit having second means operable to raise and lower said carriers, one only of said control units having third means to move said beams longitudinally relative to said carriers, support means supporting each carrier for universal movement while maintaining its axis parallel in all positions throughout such movement, said support means comprising a first generally C-shaped frame having the legs thereof pivoted to said carrier on spaced aligned axes laterally spaced from and parallel to the axis of said carrier, a second generally C-shaped frame having the legs thereof pivoted to said first generally C-shaped frame on spaced aligned axes laterally spaced from and parallel to said first-mentioned aligned axes, and means pivotally mounting said second generally C-shaped frame on fixed aligned axes laterally spaced from and parallel to said second-mentioned aligned axes.

* * * * *